United States Patent
Hunter et al.

(10) Patent No.: US 8,028,172 B2
(45) Date of Patent: *Sep. 27, 2011

(54) SYSTEMS AND METHODS FOR UPDATING A SECURE BOOT PROCESS ON A COMPUTER WITH A HARDWARE SECURITY MODULE

(75) Inventors: Jamie Hunter, Bothell, WA (US); Paul England, Bellevue, WA (US); Russell Humphries, Redmond, WA (US); Stefan Thom, Snohomish, WA (US); James Anthony Schwartz, Jr., Seattle, WA (US); Kenneth D. Ray, Seattle, WA (US); Jonathan Schwartz, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1251 days.

This patent is subject to a terminal disclaimer.

(21) Appl. No.: 11/036,018

(22) Filed: Jan. 14, 2005

(65) Prior Publication Data

US 2006/0161784 A1 Jul. 20, 2006

(51) Int. Cl.
*H04L 9/32* (2006.01)
(52) U.S. Cl. .................................................. 713/193
(58) Field of Classification Search .................. 726/16; 713/164, 193, 194
See application file for complete search history.

(56) References Cited

U.S. PATENT DOCUMENTS

| | | | |
|---|---|---|---|
| 5,937,063 A | 8/1999 | Davis | 713/187 |
| 6,189,100 B1 | 2/2001 | Barr et al. | 713/182 |
| 6,327,652 B1 | 12/2001 | England et al. | 713/2 |
| 6,330,670 B1 | 12/2001 | England et al. | 713/2 |
| 6,643,781 B1 | 11/2003 | Merriam | 726/35 |
| 6,651,171 B1 | 11/2003 | England et al. | 713/193 |
| 6,684,326 B1 | 1/2004 | Cromer et al. | 713/2 |
| 6,757,824 B1 | 6/2004 | England | 713/156 |
| 7,117,376 B2 | 10/2006 | Grawrock | 380/277 |
| 7,237,121 B2 | 6/2007 | Cammack et al. | 713/189 |
| 7,318,150 B2 * | 1/2008 | Zimmer et al. | 713/2 |
| 2002/0087877 A1 | 7/2002 | Grawrock | 713/200 |
| 2003/0037231 A1* | 2/2003 | Goodman et al. | 713/2 |
| 2003/0046542 A1 | 3/2003 | Chen et al. | 713/176 |
| 2003/0188179 A1* | 10/2003 | Challener et al. | 713/193 |
| 2003/0233558 A1 | 12/2003 | Lieberman et al. | 713/189 |

(Continued)

OTHER PUBLICATIONS

Trusted Computing Platform Alliance (TCPA) Main Specification Version 1.1b Published by the Trusted Computing Group in Feb. 2002.*

(Continued)

*Primary Examiner* — Ellen Tran
(74) *Attorney, Agent, or Firm* — Woodcock Washburn LLP

(57) ABSTRACT

Systems and methods are provided for maintaining and updating a secure boot process on a computer with a trusted platform module (TPM). A boot process may be maintained by inspecting a log of TPM activity, determining data that prevented a secret to unseal, and returning the data to an original state. In situations where this type of recovery is not workable, techniques for authenticating a user may be used, allowing the authenticated user to bypass the security features of the boot process and reseal the boot secrets to platform configuration register (PCR) values that may have changed. Finally, a secure boot process may be upgraded by migrating TPM sealed secrets to a temporary storage location, updating one or more aspects of a secure boot process, and resealing the secrets to the resulting new platform configuration. Other advantages and features of the invention are described below.

20 Claims, 7 Drawing Sheets

U.S. PATENT DOCUMENTS

| | | | |
|---|---|---|---|
| 2005/0021968 A1* | 1/2005 | Zimmer et al. | 713/176 |
| 2005/0108564 A1* | 5/2005 | Freeman et al. | 713/200 |
| 2006/0047944 A1 | 3/2006 | Kilian-Kehr | 713/2 |
| 2006/0053302 A1 | 3/2006 | Yasaki et al. | 713/183 |
| 2006/0064752 A1 | 3/2006 | Wang et al. | 726/19 |

OTHER PUBLICATIONS

Chuang, S.-C., et al., "A Case Study of Secure ATM Switch Booting," *Proceedings of the Symposium on Network and Distributed System Security*, San Diego, California, Feb. 22-23, 1996, 103-112.

Held, G., "Focus on: Encryption Plus," *International Journal of Network Maagement*, Jan.-Feb. 2002, 12(1), 61-66.

Taylor, K., et al., Protect Your Notebook [notebook security], *Personal Computer World*, Jul. 2004, 27(7), 107-109.

Yue-Zhi, Z., et al., "A Customizable Boot Protocol for Network Computing," *Journal of Software*, Mar. 2003, 14(3), 538-546.

In the United States Patent and Trademark Office, Non-Final Office Action dated Jun. 20, 2008, In re U.S. Appl. No. 11/031,161, filed Jan. 7, 2005, 15 pages.

In the United States Patent and Trademark Office, Non-Final Office Action dated Jun. 18, 2008, In re U.S. Appl. No. 11/035,715, filed Jan. 14, 2005, 13 pages.

* cited by examiner

SYSTEMS AND METHODS FOR UPDATING A SECURE BOOT PROCESS ON A COMPUTER WITH A HARDWARE SECURITY MODULE

CROSS-REFERENCE TO RELATED APPLICATIONS

This application is related to co-pending U.S. patent application entitled "Systems and Methods for Securely Booting a Computer With a Trusted Processing Module," U.S. patent application Ser. No. 11/031,161, filed Jan. 7, 2005, and to co-pending U.S. patent application entitled Systems and Methods for Boot Recovery in a Secure Boot Process On A Computer With A Hardware Security Module, U.S. patent application Ser. No. 11/035,715, filed Jan. 14, 2005, and issued on Mar. 17, 2009 with U.S. Pat. No. 7,506,380.

FIELD OF THE INVENTION

The present invention relates generally to the field of computing. More particularly, the invention provides mechanisms for failure recovery in systems with a trusted platform module (TPM) validated boot process, and mechanisms for updating a TPM validated boot process.

BACKGROUND OF THE INVENTION

Security has become a widespread concern for computer users. Viruses, worms, Trojan horses, identity theft, software and media content piracy, and extortion using threats of data destruction are rampant. An operating system can provide numerous security features to guard against such attacks. However, the security features of an operating system are ineffective if they are disabled. Disabling such security features, if it is attempted, will likely be attempted during the boot of the operating system. After boot, an operating system may have numerous features in place for protecting itself and the data and processes which it manages. During boot, however, those features may not yet be initialized and are vulnerable to bypass and/or tampering.

To this end, a secure boot process for a computer with a TPM has been developed by MICROSOFT®, as can be understood with reference to a U.S. patent application entitled "Systems and Methods for Securely Booting a Computer With a Trusted Processing Module," U.S. patent application Ser. No. 11/031,161, filed Jan. 7, 2005. Also related to this application are a U.S. patent application entitled "Systems and Methods for Controlling Access to Data on a Computer with a Secure Boot Process," U.S. patent application Ser. No. 11/036,415, filed Jan. 14, 2005, and issued on Jul. 21, 2009, with U.S. Pat. No. 7,565,553, a U.S. patent application entitled "Systems and Methods for Boot Recovery in a Secure Boot Process on a Computer with a Hardware Security Module," U.S. patent application Ser. No. 11/035,715, filed Jan. 14, 2005, and issued on Mar. 17, 2009, with U.S. Pat. No. 7,506,380, and a U.S. patent application entitled "System and Method for Protected Operating System Boot Using State Validation" U.S. patent application Ser. No. 10/882,134, filed Jun. 30, 2004.

Systems and methods for secure boot processes on computers with TPMs will likely need to rely on technology for maintaining and updating the boot process. Such updates, while they may occur rarely, may require techniques to effectively integrate maintenance with TPM security. Perhaps because TPM secured boot processes remain largely unexplored, maintenance of such systems is also unexplored. Thus there is an unmet need in the industry to address the maintenance and update of TPM secured boot processes.

SUMMARY OF THE INVENTION

In consideration of the above, the present invention provides systems and methods for maintaining and updating a secure boot process on a computer with a trusted platform module (TPM). A boot process may recover from boot failures by inspecting a log of TPM activity, determining data that prevented a secret to unseal, and returning the data to an original state. In situations where this type of recovery is not workable, techniques for authenticating a user may be used, allowing the authenticated user to bypass the security features of the boot process and reseal the boot to platform configuration registers (PCRs) that may have changed. Finally, a secure boot process may be upgraded by migrating TPM sealed secrets to a temporary storage location, updating one or more aspects of a secure boot process, and resealing the secrets to the resulting new platform configuration. Other advantages and features of the invention are described below.

BRIEF DESCRIPTION OF THE DRAWINGS

The systems and methods for maintaining and updating a secure boot process in accordance with the present invention are further described with reference to the accompanying drawings in which.

DETAILED DESCRIPTION OF ILLUSTRATIVE EMBODIMENTS

Certain specific details are set forth in the following description and figures to provide a thorough understanding of various embodiments of the invention. Certain well-known details often associated with computing and software technology are not set forth in the following disclosure, however, to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention.

The following detailed description will generally follow the summary of the invention, as set forth above, further explaining and expanding the definitions of the various aspects and embodiments of the invention as necessary. To this end, this detailed description first sets forth a computing environment in FIG. 1 that is suitable to implement the software and/or hardware techniques associated with the invention. A networked computing environment is illustrated in FIG. 2 as an extension of the basic computing environment, to emphasize that modem computing techniques can be performed across multiple discrete devices.

Figure 3:
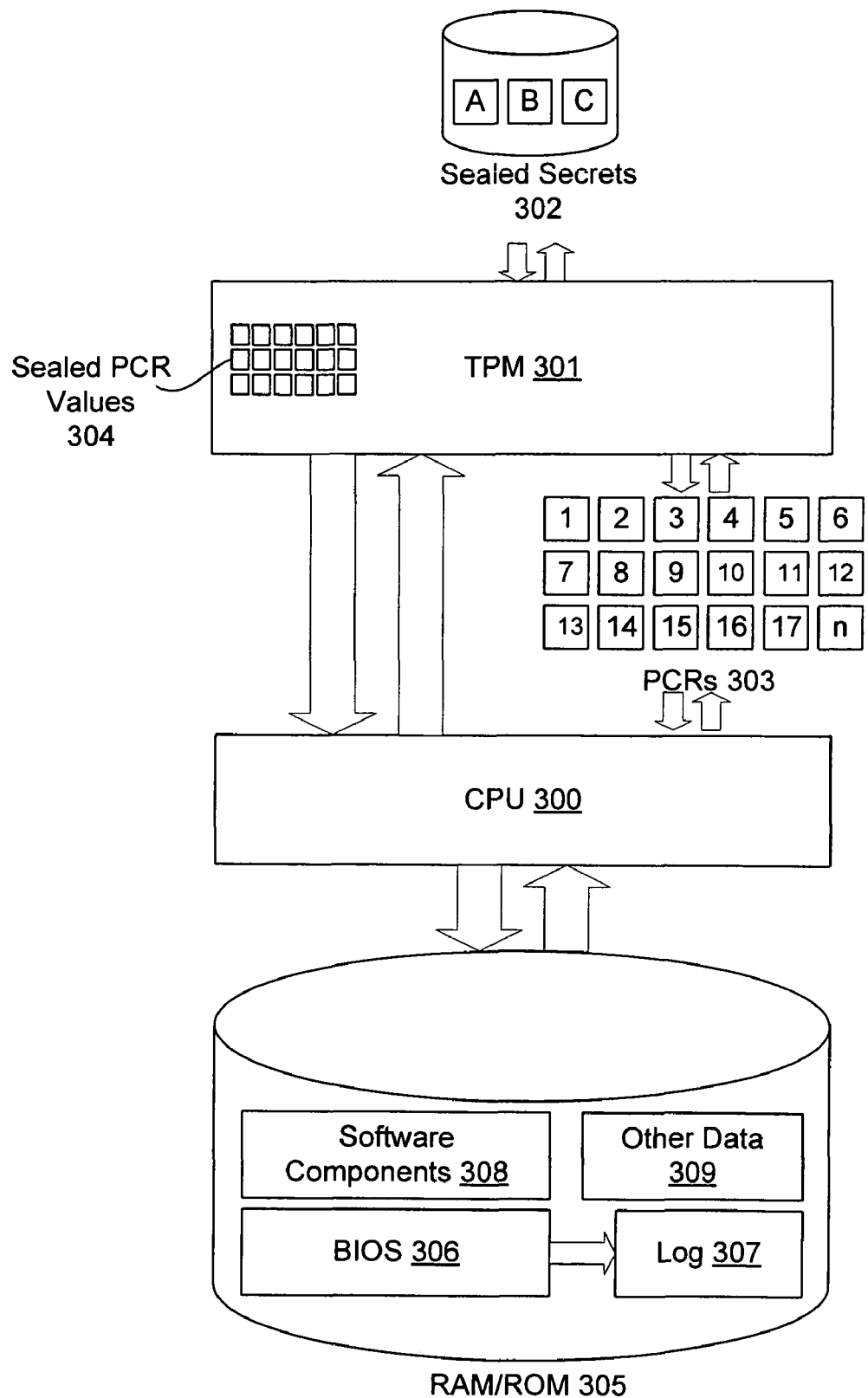
FIG. 3 illustrates a computing platform that makes use of a Trusted Platform Module (TPM).

Next, a summary of a computing platform that makes use of a hardware security module (HSM) is provided, in connection with FIG. 3, to explain how measurements may be submitted to an HSM, which can be configured to unseal secrets if the submitted measurements are correct. Note that the HSM illustrated in FIG. 3 is a TPM, which is an HSM that is readily recognized by those of skill in the art. The operations of a TPM can be logged in memory, for example by the BIOS. These logs are used to detect appropriate data for repair/recovery in embodiments of the invention. The use of a TPM by software components in a boot process is then illustrated in FIG. 4. FIG. 5 shows one general pattern for use of the TPM by the software components such as those of FIG. 4, in which the loading and execution of a next software component may be contingent on the successful unsealing of a secret. To unseal the secret, correct measurement values are stored in the PCRs, thereby indicating that the measured data is as it was when the TPM secrets were sealed.

Figure 7:
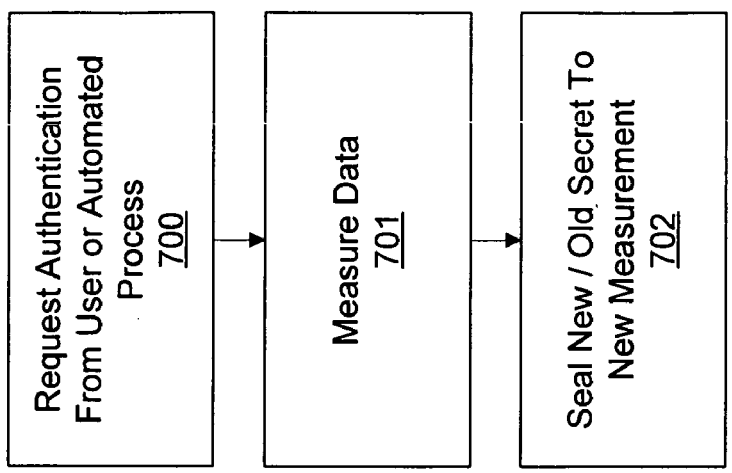
FIG. 7 illustrates a process for authenticating a user and allowing the authenticated user to reseal secure boot to a changed platform.
Figure 6:
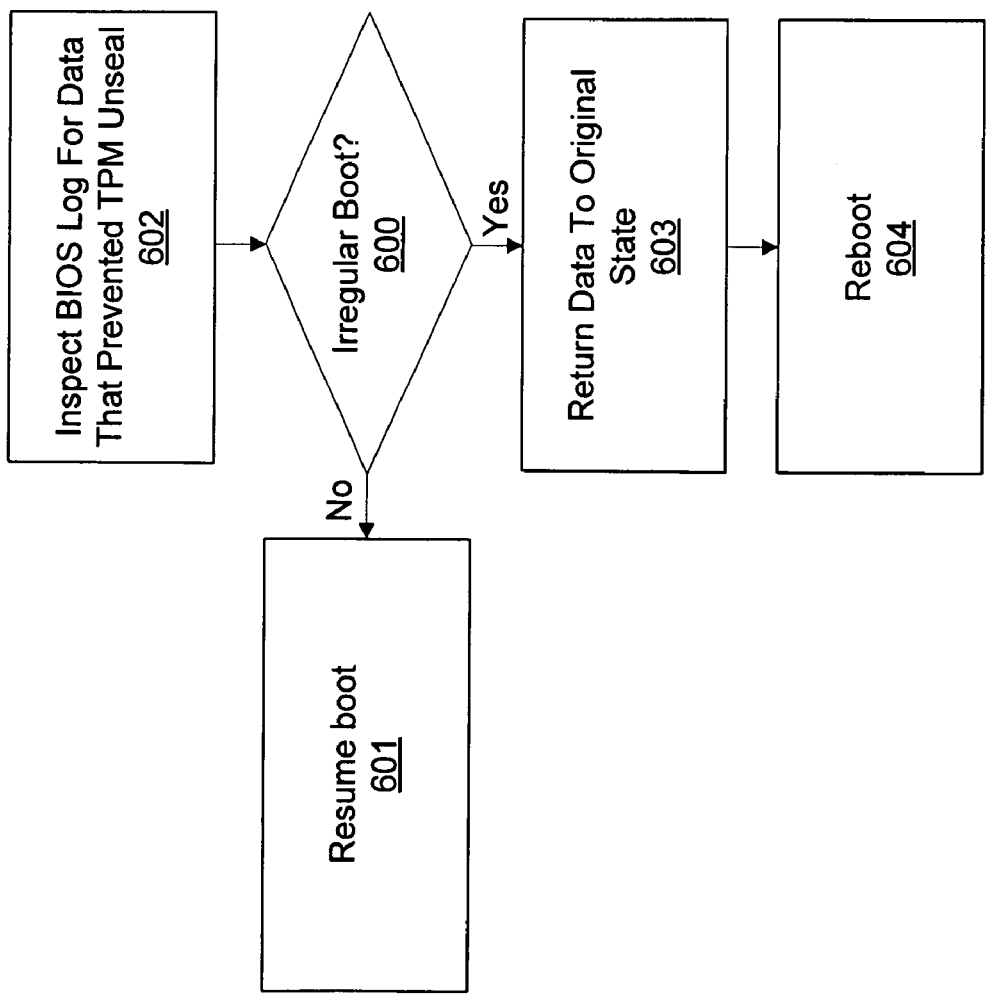
FIG. 6 demonstrates a process for recovery from boot failure by returning data used in boot to an original state.
Figure 8:
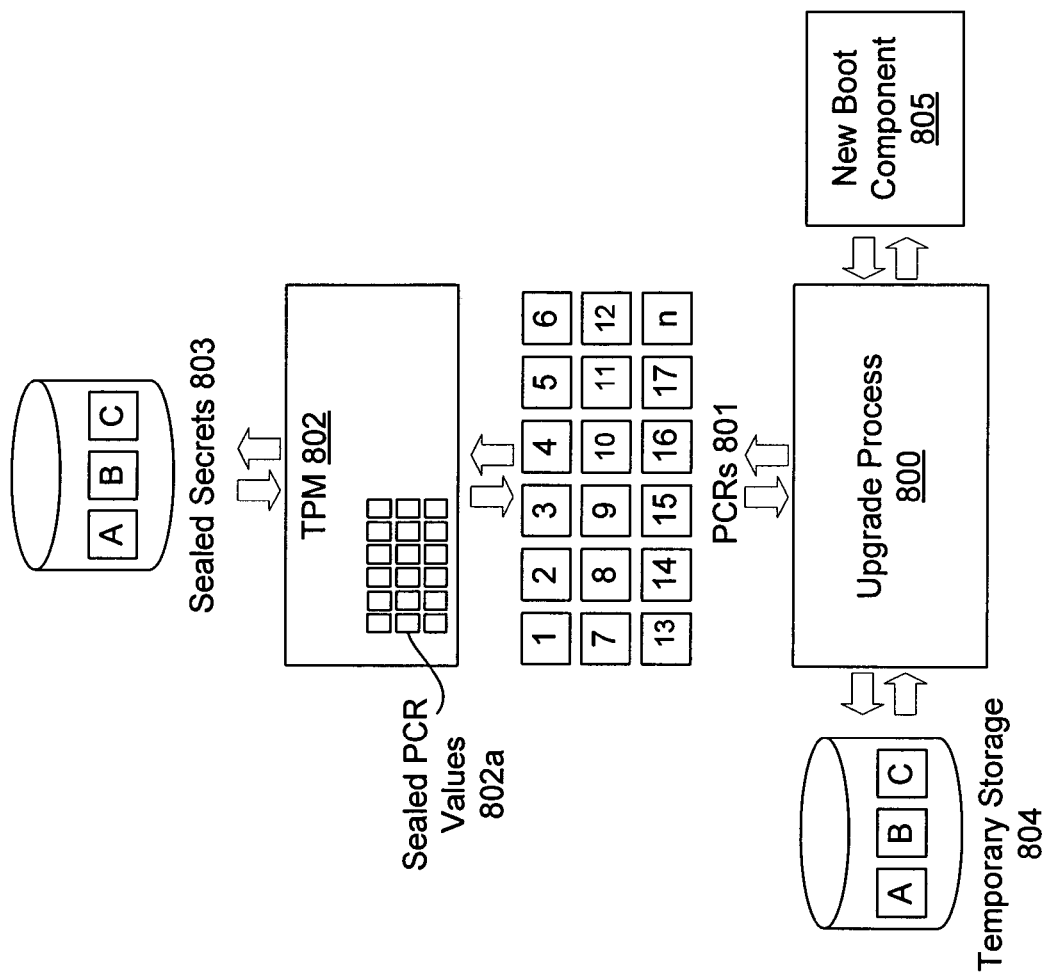
FIG. 8 illustrates a process for updating a secure boot process, in which secrets are migrated to a temporary location, data used in boot is updated, and the secrets are resealed to new platform measurements.

FIG. 6 demonstrates an exemplary process for returning data to an original state and rebooting when a secret does not successfully unseal. FIG. 7 demonstrates an exemplary process for authenticating a user prior so that the user can authorize a boot process after an unsealing operation was blocked by the TPM. FIG. 8 illustrates an exemplary schematic diagram in which an update process manages an update to data used in a secure boot, by unsealing TPM secrets, storing them in a temporary location, updating data used for boot, and resealing the secrets to the updated platform configuration.

Exemplary Computing and Networked Environments

Figure 1:
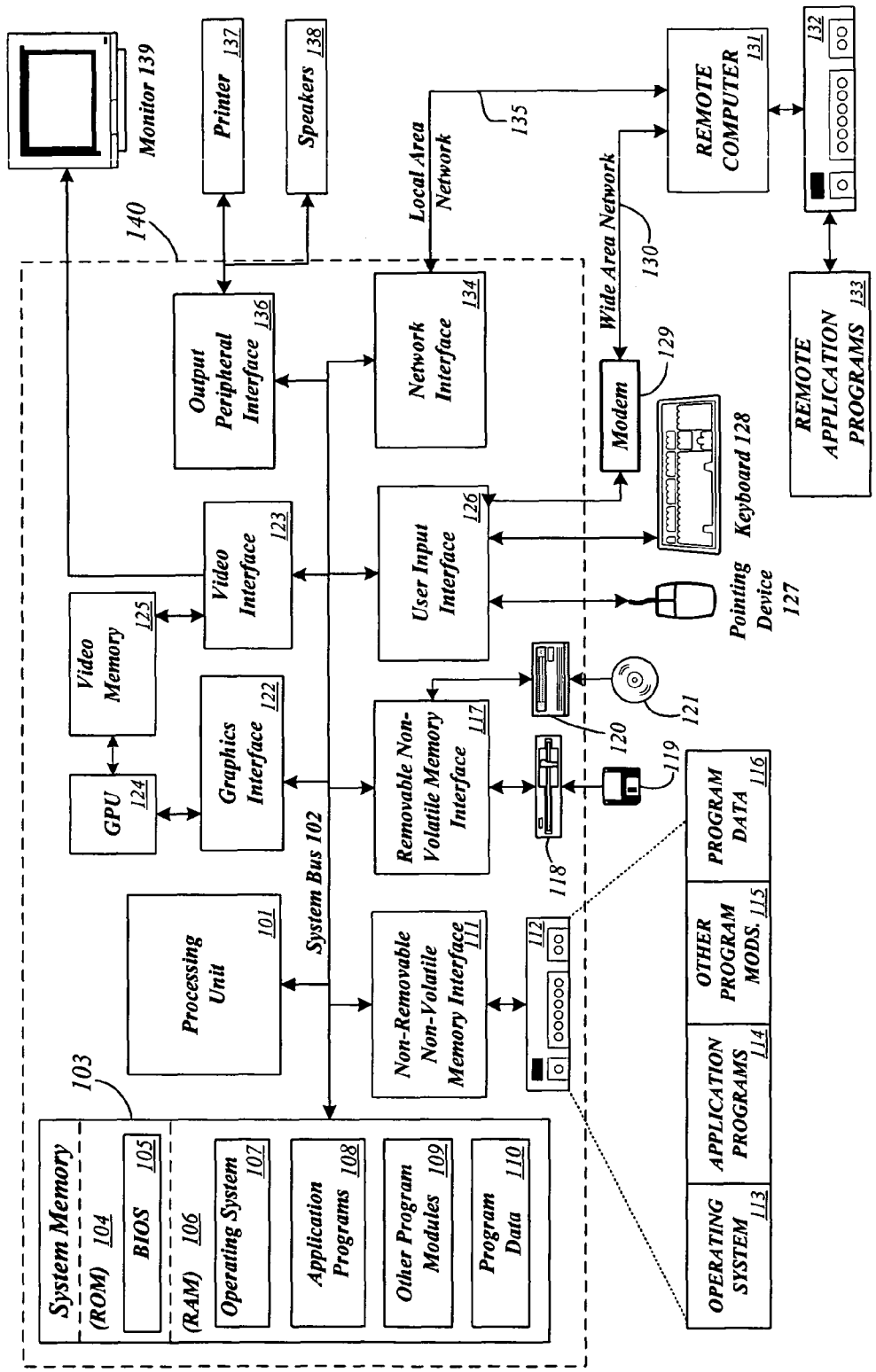
FIG. 1 sets forth a computing environment that is suitable to implement the software and/or hardware techniques associated with the invention.
Figure 2:
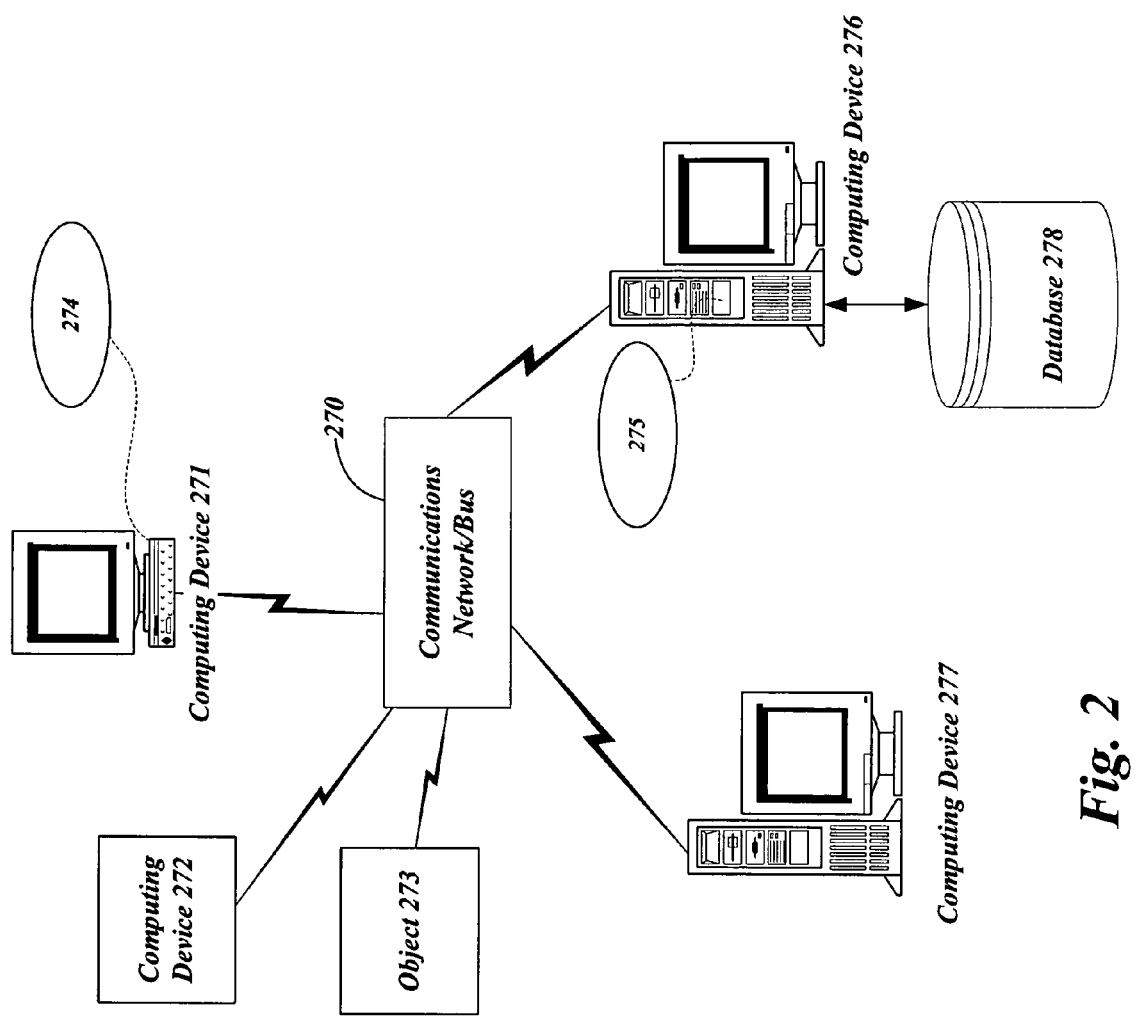
FIG. 2 provides an extension of the basic computing environment from FIG. 1, to emphasize that modern computing techniques can be performed across multiple networked devices.

The computing system environment 100 in FIG. 1 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be implemented in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 121. Components of computer 121 may include, but are not limited to, a processing unit 101, a system memory 103, and a system bus 102 that couples various system components including the system memory to the processing unit 101. The system bus 102 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

An HSM is not shown in FIG. 1, though such a device may be a part of computers that implement the invention. FIG. 3 shows an HSM (a TPM in the embodiments of FIG. 3) that is integrated with some components of a computer, as will be discussed with reference to FIG. 3 below. In a classic embodiment, an HSM may be a hardware chip that is welded to the motherboard of a computer such as that of FIG. 1 for the purpose of providing a range of security functions. However, for the purpose of this specification, it should be understood that an HSM can be implemented in hardware or software, and is defined broadly as a functional unit that can provide those trusted functions that are needed for operation of the invention, i.e. comparison and verification of measurements submitted to it, and release of keys for access to encrypted memory resources. The TPM may also provide a range of other functions, as described in the TCG® specifications for an industry standard TPM.

Computer 121 typically includes a variety of computer readable media. Computer readable media can be any available media that can be accessed by computer 121 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 121. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 103 includes computer storage media in the form of volatile and/or nonvolatile memory such as read only memory (ROM) 104 and random access memory (RAM) 106. A basic input/output system 105 (BIOS), containing the basic routines that help to transfer information between elements within computer 121, such as during start-up, is typically stored in ROM 104. RAM 106 typically contains data and/or program modules that are immediately accessible to and/or presently being operated on by processing unit 101. By way of example, and not limitation, FIG. 1 illustrates operating system 107, application programs 108, other program modules 109, and program data 110.

The computer 121 may also include other removable/non-removable, volatile/nonvolatile computer storage media. By way of example only, FIG. 1 illustrates a hard disk drive 112 that reads from or writes to non-removable, nonvolatile magnetic media, a magnetic disk drive 118 that reads from or writes to a removable, nonvolatile magnetic disk 119, and an optical disk drive 120 that reads from or writes to a removable, nonvolatile optical disk 253 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 112 is typically connected to the system bus 102 through an non-removable memory interface such as interface 111, and magnetic disk drive 118 and optical disk drive 120 are typically connected to the system bus 102 by a removable memory interface, such as interface 117.

The drives and their associated computer storage media discussed above and illustrated in FIG. 1, provide storage of computer readable instructions, data structures, program modules and other data for the computer 121. In FIG. 1, for example, hard disk drive 112 is illustrated as storing operating system 113, application programs 114, other program modules 115, and program data 116. Note that these components can either be the same as or different from operating system 107, application programs 108, other program modules 109, and program data 110. Operating system 113, application programs 114, other program modules 115, and program data 116 are given different numbers here to illustrate that, at a minimum, they are different copies. A user may enter commands and information into the computer 121 through input devices such as a keyboard 128 and pointing device 127, commonly referred to as a mouse, trackball or touch pad. Other input devices (not shown) may include a microphone, joystick, game pad, satellite dish, scanner, or the like. These and other input devices are often connected to the processing unit 101 through a user input interface 126 that is coupled to the system bus, but may be connected by other interface and bus structures, such as a parallel port, game port or a universal serial bus (USB). A monitor 139 or other type of display device is also connected to the system bus 102 via an interface, such as a video interface 232. In addition to the monitor, computers may also include other peripheral output devices such as speakers 138 and printer 137, which may be connected through an output peripheral interface 123.

The computer 121 may operate in a networked environment using logical connections to one or more remote computers, such as a remote computer 131. The remote computer 131 may be a personal computer, a server, a router, a network PC, a peer device or other common network node, and typically includes many or all of the elements described above relative to the computer 121, although only a memory storage device 132 has been illustrated in FIG. 1. The logical connections depicted in FIG. 1 include a local area network (LAN) 135 and a wide area network (WAN) 130, but may also include other networks. Such networking environments are commonplace in offices, enterprise-wide computer networks, intranets and the Internet.

When used in a LAN networking environment, the computer 121 is connected to the LAN 135 through a network interface or adapter 134. When used in a WAN networking environment, the computer 121 typically includes a modem 129 or other means for establishing communications over the WAN 130, such as the Internet. The modem 129, which may be internal or external, may be connected to the system bus 102 via the user input interface 126, or other appropriate mechanism. In a networked environment, program modules depicted relative to the computer 121, or portions thereof, may be stored in the remote memory storage device. By way of example, and not limitation, FIG. 1 illustrates remote application programs 133 as residing on memory device 132. It will be appreciated that the network connections shown are exemplary and other means of establishing a communications link between the computers may be used.

It should be understood that the various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the invention. In the case of program code execution on programmable computers, the computing device generally includes a processor, a storage medium readable by the processor (including volatile and non-volatile memory and/or storage elements), at least one input device, and at least one output device. One or more programs that may implement or utilize the processes described in connection with the invention, e.g., through the use of an API, reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

Although exemplary embodiments refer to utilizing the present invention in the context of one or more stand-alone computer systems, the invention is not so limited, but rather may be implemented in connection with any computing environment, such as a network or distributed computing environment. Still further, the present invention may be implemented in or across a plurality of processing chips or devices, and storage may similarly be effected across a plurality of devices. Such devices might include personal computers, network servers, handheld devices, supercomputers, or computers integrated into other systems such as automobiles and airplanes.

An exemplary networked computing environment is provided in FIG. 2. One of ordinary skill in the art can appreciate that networks can connect any computer or other client or server device, or in a distributed computing environment. In this regard, any computer system or environment having any number of processing, memory, or storage units, and any number of applications and processes occurring simultaneously is considered suitable for use in connection with the systems and methods provided.

Distributed computing provides sharing of computer resources and services by exchange between computing devices and systems. These resources and services include the exchange of information, cache storage and disk storage for files. Distributed computing takes advantage of network connectivity, allowing clients to leverage their collective power to benefit the entire enterprise. In this regard, a variety of devices may have applications, objects or resources that may implicate the processes described herein.

FIG. 2 provides a schematic diagram of an exemplary networked or distributed computing environment. The environment comprises computing devices 271, 272, 276, and 277 as well as objects 273, 274, and 275, and database 278. Each of these entities 271, 272, 273, 274, 275, 276, 277 and 278 may comprise or make use of programs, methods, data stores, programmable logic, etc. The entities 271, 272, 273, 274, 275, 276, 277 and 278 may span portions of the same or different devices such as PDAs, audio/video devices, MP3 players, personal computers, etc. Each entity 271, 272, 273, 274, 275, 276, 277 and 278 can communicate with another entity 271, 272, 273, 274, 275, 276, 277 and 278 by way of the communications network 270. In this regard, any entity may be responsible for the maintenance and updating of a database 278 or other storage element.

This network 270 may itself comprise other computing entities that provide services to the system of FIG. 2, and may itself represent multiple interconnected networks. In accordance with an aspect of the invention, each entity 271, 272, 273, 274, 275, 276, 277 and 278 may contain discrete functional program modules that might make use of an API, or other object, software, firmware and/or hardware, to request services of one or more of the other entities 271, 272, 273, 274, 275, 276, 277 and 278.

It can also be appreciated that an object, such as 275, may be hosted on another computing device 276. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wired or wireless systems, by local networks or widely distributed networks. Currently, many networks are coupled to the Internet, which provides an infrastructure for widely distributed computing and encompasses many different networks. Any such infrastructures, whether coupled to the Internet or not, may be used in conjunction with the systems and methods provided.

A network infrastructure may enable a host of network topologies such as client/server, peer-to-peer, or hybrid architectures. The "client" is a member of a class or group that uses the services of another class or group to which it is not related. In computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the example of FIG. 2, any entity 271, 272, 273, 274, 275, 276, 277 and 278 can be considered a client, a server, or both, depending on the circumstances.

A server is typically, though not necessarily, a remote computer system accessible over a remote or local network, such as the Internet. The client process may be active in a first computer system, and the server process may be active in a second computer system, communicating with one another over a communications medium, thus providing distributed functionality and allowing multiple clients to take advantage of the information-gathering capabilities of the server. Any software objects may be distributed across multiple computing devices or objects.

Client(s) and server(s) communicate with one another utilizing the functionality provided by protocol layer(s). For example, HyperText Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over a communications medium, e.g., client(s) and server(s) may be coupled to one another via TCP/IP connection(s) for high-capacity communication.

In light of the diverse computing environments that may be built according to the general framework of FIG. 1, and the further diversification that can occur in computing in a network environment such as that of FIG. 2, the systems and methods provided herein cannot be construed as limited in any way to a particular computing architecture. Instead, the present invention should not be limited to any single embodiment, but rather should be construed in breadth and scope in accordance with the appended claims.

Exemplary HSM Secured Boot Sequence

Embodiments of the invention are directed to recovery and upgrade of secure boot processes. An exemplary computer architecture for implementing one type of secure boot process—namely, one using an HSM. One type of HSM, a TPM—is illustrated in FIG. 3. A TPM is illustrated in the context of a computer architecture. While the TPM contemplated for use in embodiments of the invention may be TCG® 1.2 compliant, any functional unit for comparing registered measurements, such as PCRs, and returning trusted results and/or keys for accessing encrypted data may be used. A secure boot process that uses a TPM may be implemented in a variety of ways. For the purpose of discussing the invention, a particular implementation of such a boot process is set forth here.

In this regard, FIG. 3 presents a CPU 300 with access to memory 305, in a highly generalized view of a computer such as that of FIG. 1. The CPU 300 may rely on a TPM 301 for certain security functions. In general, the CPU 300 may first perform measurements of data involved in a boot process, and those measurements may be securely stored in the TPM 301, as illustrated by the sealed PCR values 304. Note that in various embodiments the various PCR values 304 and 303 illustrated in the figures herein my in fact be stored in one or more single storage locations that are extended by an algebraic formula, as defined in the TCG® 1.2 specification.

Secrets 302 may be sealed to the particular PCR values 304 in the TPM 301. To retrieve the secrets 302 from the TPM 301, correct PCR values must be entered into PCRs 303. These correct values may be obtained by measuring the same data that was measured to obtain PCR values 304 sealed in the TPM 301. Multiple secrets 302 may be sealed to a variety of PCRs 304. For example, to retrieve a first secret A, it may be required that a correct value be stored in PCR [1], PCR [2] and PCR [3]. To obtain a second secret B, a fourth correct value may be required in PCR [4].

If a measurement is placed in a PCR 303 that does not match a value for that measurement sealed in the TPM 301, then when the TPM 301 is requested to unseal a secret 302, the unseal will fail. If correct measurements are placed in PCRs 303, then the TPM 301 can be trusted to unseal secrets 302 when requested to do so. Therefore, a "correct" measurement, or correct value, for purposes of this application, is a measurement to which a secret 302 is sealed, and thereby permits unsealing of the secret 302 by the TPM 301. Note that a correct measurement could be, in some embodiments, a measurement of malicious code. This is the case, for example, when the initial measurements 304 sealed in the TPM 301 are corrupt. This scenario in which vulnerable or corrupt code is discovered in a boot process presents a strong case for the upgrade processes disclosed herein.

The secrets sealed to particular measurements may be any data. Typically, secrets 302 will take the form of decryption keys and/or Binary Large Objects (BLOBS). In general, a key provides information that can be used to decrypt data. A sealed BLOB may contain a key as well as other data that may be useful. In this regard, equivalents for various techniques discussed herein may be constructed by substituting keys for BLOBS and vice versa, as will be appreciated by those of skill in the art. Thus, if a CPU 300 submits correct measurements to PCRs in 303, then when a corresponding secret 302 such as a key is requested, the TPM 301 can unseal the secret 302. The key from 302 may then be used to decrypt portions of memory 305 accessible by the CPU 300. In embodiments of the invention, a TPM 301 may be configured to grant access to three secrets, A, B, and C, as shown in FIG. 3. The secrets 302 may be sealed to various required PCR values, and therefore may be accessible only after certain measurements are performed. These three keys, or three secrets, will be referred to here as, first, a boot access only secret, second, a volume-bound secret, and third, a password secret.

TPM related activity may be stored in a log 307. The log 307 may be maintained by the computer's BIOS in some embodiments. Any other process may also be responsible for maintaining a log 307. Thus, if data such as a software component 308 or other data 309 is measured into a PCR 303, the data that was measured may be identified in the log 307. If a secret unseal request is made, the request event may be identified in the log 307. These are but two examples of storing TPM related activity in a log 307, which may contain records for a wide range of other events and activities.

Typically, a TPM 301 operates in conjunction with a Static Root of Trust Measurement (SRTM) for performing trusted measurements and submitting them to a TPM 301. Embodiments of the invention may use an SRTM in this manner, and in this regard the SRTM may be a BIOS standard SRTM used by the various software components (also called processes and RTMs) discussed herein to measure initial disk based boot code. The system may also extend the SRTM to measure other code and critical data involved in the early stages of booting of an operating system so that any early stages of an operating system boot can be measured. Note that PCRs 303 may contain values obtained from anywhere. The values may be measurements of data such as software components 308 or other data 309. The invention is not limited to any exclusive combination of data measurements or other values that are placed in PCRs 303.

Figure 4:
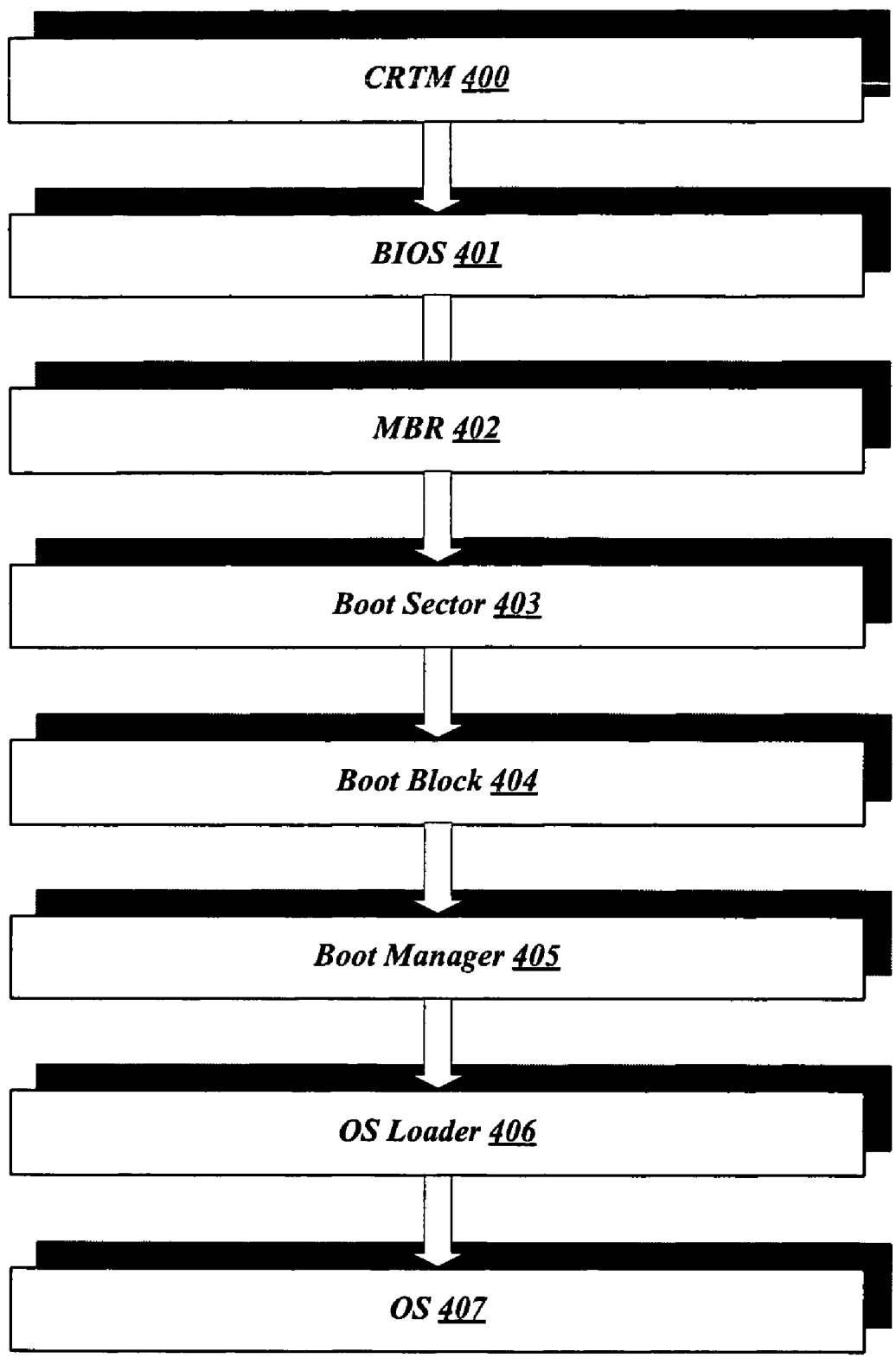
FIG. 4 illustrates an exemplary boot process wherein a plurality of software components measure a subsequent process prior to transitioning to the subsequent process.
Figure 5:
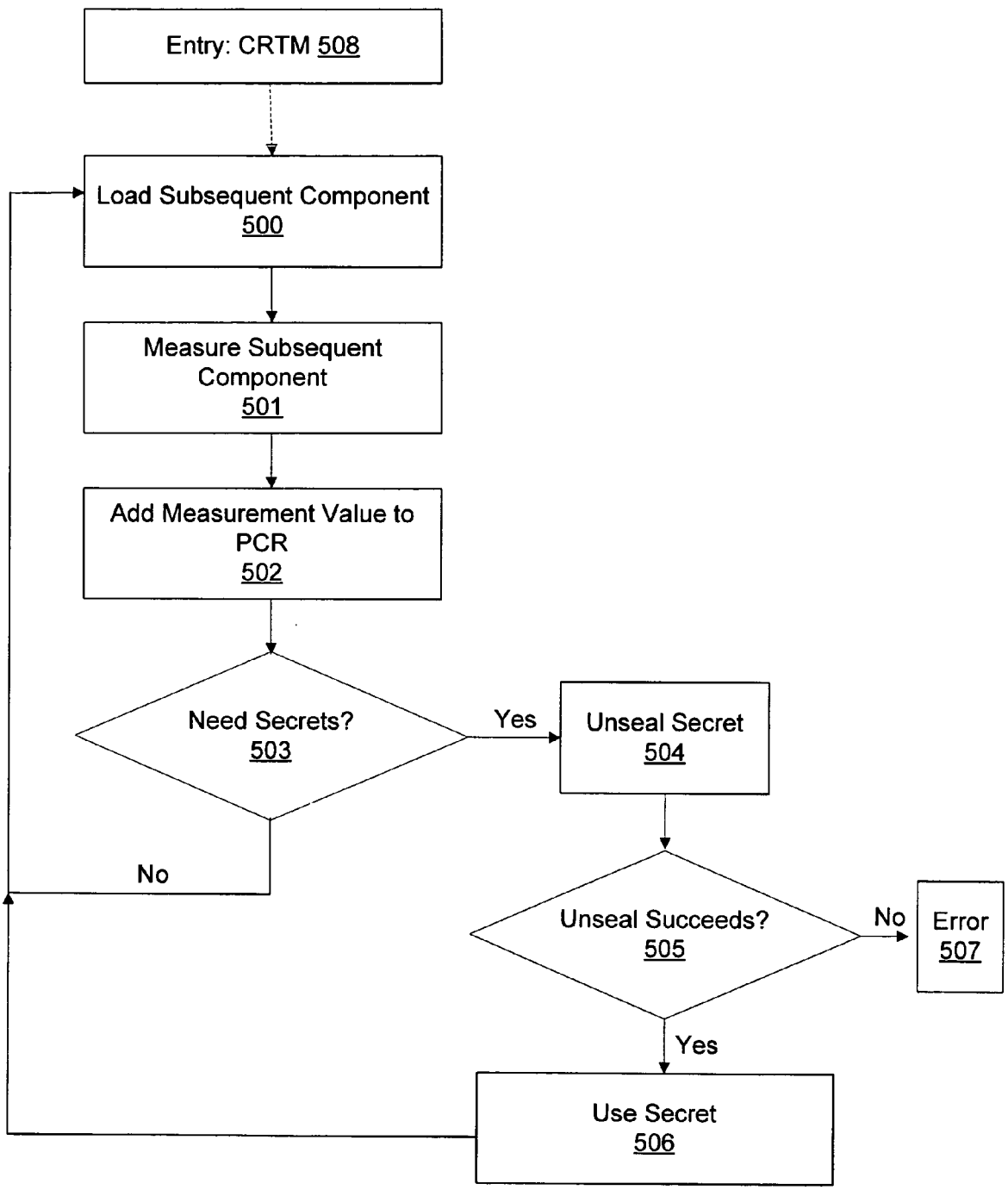
FIG. 5 illustrates a general technique for using a hardware security module (HSM), such at a TPM, ensure the integrity of a subsequent software component or process prior to allowing that subsequent component to execute.

In a TPM secured boot process, the arrangement displayed in FIG. 3 may be used to measure the exemplary software components illustrated in FIG. 4, and store the measurements in the PCRs 303. The boot components illustrated in FIG. 4, which may be chosen to be measured by embodiments of the invention, and particularly disk based code components, are known to change rarely, and are subject to an easy attack. Therefore enforcing that certain boot components remain unchanged, unless by qualified maintenance and update processes as described herein, is a relatively small price to pay to significantly enhance data security.

Referring to FIG. 4, a series of software components 400-407 is illustrated to provide an exemplary boot process for a computer. The invention is not limited to the particular components shown, nor to the sequence of components. The illustrated components may be sequentially loaded, starting with the Core Root of Trust for Measurement (CRTM) 400, and ending with the components of an Operating System (OS) 407, which is generalized here as a single software component 407. Loading a component entails giving the component access to the resources of a computer, such as memory and the CPU, so that the instructions of the component can be executed by the CPU. If a component in FIG. 4 is malicious or corrupt, it can be used to circumvent security measures once it is loaded. Thus, a process for booting a computer in conformance with the invention comprises measuring a component or plurality of components into one or more PCRs 303 prior to allowing the component(s) to execute. Successful boot may be made contingent on secrets 302 sealed to a trusted set of measurements 304 that are sealed in the TPM. Note, however, that the invention may also seal measurements of malicious code in a TPM. If malicious code is running at the time of seal, then those measurements may be needed for boot. Ideally, the secrets are sealed to measurements 304 of trusted code. If the measurements placed in PCRs 303 are correct, then secrets from 302 may be unsealed, allowing a machine to proceed with secure boot. The process of unsealing a secret 302 is illustrated in FIG. 5.

In some usage scenarios, the owner of a machine may determine that they wish to "lock" the configuration of the machine, ensuring no ROM-based code in addition to that previously validated is ever executed. In this case, the machine owner may configure more software components to be involved in the validation process (BIOS, option ROMs) by selecting additional PCRs 302 to be used. The owner may also determine they wish to additionally utilize a machine password that is validated by the TPM 301. This allows the security to be extended above what may be typically provided in standard embodiments of the invention, and allows a user to weigh machine security against ease of use.

FIG. 5 illustrates a technique for using a TPM to ensure the integrity of a subsequent software component prior loading that subsequent component. The steps of FIG. 5 may be carried out by placing appropriate instructions in a series of components, such as the components of FIG. 4. In this regard, the process of FIG. 5 may begin with the execution of a CRTM component 508. A component, such at the CRTM and some or all of the other components of FIG. 4 may bear instructions for measuring another component and placing the result in a PCR, such as from 303 in FIG. 3. A component bearing such instructions is sometimes referred to as a Root of Trust for Measurement (RTM), and may contain instructions for utilizing an SRTM as mentioned above. Thus, if the boot block measures the boot manager, the boot block serves as an RTM for the boot manager.

An RTM can load a subsequent component into memory 500, and then perform a measurement on a subsequent component 501, and add the measurement to a PCR 502. If the RTM needs a secret, such as a key or a BLOB from the TPM 503, then it may request such secrets, and the TPM will release the requested secret(s) only if correct PCR values are loaded for all PCRs needed to access the secret. Thus, an attempt may be made to unseal a secret based on information retrieved from the TPM 504. If the unseal succeeds in step 505, additional steps may be taken, which may comprise loading a subsequent component, as well as other actions described below. Generally, a normal boot is one which is contemplated for the majority of the boots undertaken by a boot process. Such a boot will typically be one in which the unsealing of secrets does not fail, and no additional measures, beyond the normal boot process itself, are needed to ensure the security of the machine.

If the unseal does not succeed, the values in the PCRs were likely incorrect and thus the executing code may be corrupt. An error may result in step 507 and appropriate measures can be taken to ensure that no access is provided to the sensitive information stored on the computer, for example, by using encryption of the data on the computer's disk and refraining from giving out the decryption key. Alternatively, processes for maintaining the system for example by restoring it to a state which will produce correct PCR values, or by authenticating a user to authorize new sealed PCR values—in values 302 from FIG. 3—may be implemented. Such processes are explained in detail below. If no secrets are needed in step 503, a subsequent component can be loaded without requesting any secrets, as shown.

FIG. 4 and FIG. 5 may be referred to together to illustrate exemplary boot processes conforming to the systems and methods of the invention. A CRTM 400 can be loaded first, which loads and measures a Basic Input/Output System (BIOS) 401. This measurement can be made, for example, by performing a hash over the BIOS, and then submitting the hash measurement value to a PCR. The BIOS may then be allowed to execute, and may serve as an RTM for the Master Boot Record (MBR) 402. The MBR can be measured into a PCR, then the MBR 402 may be allowed to execute. The MBR may measure a boot sector component 403, which is then allowed to execute. This pattern of loading, measuring, writing to a PCR, and then transitioning to a subsequent component can be repeated by each component 404, 405, 406, and 407, as well as components in the operating system 407 as necessary.

The basic process of FIG. 4 and FIG. 5 can be enhanced by requiring some of the components 400-406 to retrieve secrets, which may be decryption keys, BLOBS, or other guarded information that allows access to decryption keys and the like prior to transitioning to a subsequent component. Embodiments of the invention may thus condition the performance of useful operations by an operating system on access to one or more secrets at strategic points in a boot process. If it is discovered that any of the code modules 401-406 (also referred to here as components and/or software processes) that are measured were changed, then these secrets can be withheld. To repair the machine to a state from which it can successfully boot, the systems and methods described below may be implemented. These systems and methods may include techniques for updating a boot process, such as updating a process with a known vulnerability.

Exemplary Systems and Methods for Repairing and Upgrading a Protected Boot Process Embodiments of the invention may incorporate processes for diagnosing and repairing, as well as upgrading the data used in securely booting a computer. Such data may be software components or other data that is measured into PCRs, and which must, in a standard secure boot, be measured into appropriate PCRs to allow unsealing of a secret. Of course, any other data used in boot may also be repaired and/or upgraded.

A first observation for diagnosing problems in a boot process is that the process of unsealing a secret provides a means for determining if data measurements were correct or not. Referring to FIG. 5, there may thus be two possible results from step 505: yes, and no. Either the secret will unseal, which indicates that of the data being measured, only validated data has been used and validated code has been executed—or it will not unseal, which indicates that it is possible that non-validated data has been used and/or non-validated code has been executed. The situation wherein the unseal operation fails yields the error 507 in FIG. 5. FIG. 6 and FIG. 7 provide avenues for recovering from such an error 505.

With reference to FIG. 6, an exemplary technique for recovering from a failed unseal operation is to determine the data that resulted in an erroneous PCR value, restore that data to an original state, and reboot. With regard to this technique, various embodiments may incorporate steps 601-604. In this regard, a first step 601 in an exemplary recovery process may be to inspect BIOS logs to determine the cause of failure 602. A TCG® compliant BIOS will maintain such logs. The cause of failure may be the software component or other data that, when measured into a PCR, did not match the corresponding TPM-sealed measurement and therefore resulted in an unseal failure.

Data gleaned from inspection of the BIOS logs in step 602 can be used to determine if an irregular boot occurred 603. If so, steps 603 and 604 may be taken. If not, other security measures may be implemented, or the error may be resolved and boot may be resumed 601. Thus, if the user booted in an unusual manner such as by attempting a network boot before booting off the system disk, then a computer may be rebooted according to steps 603-604 in an attempt to boot in an expected manner. This may resolve the unseal difficulty without further action.

Information from the BIOS logs can then be used, in some embodiments, to diagnose the problem for more informative feedback when the error is accidental rather than intentional. If it is determined that the error was intentional, additional measures may be taken to prevent an attack on a system, including a block to the recovery process. In situations where the failure was accidental, however, recovery may proceed. It may not be possible to determine whether the failure was accidental or intentional. If this is the case, it can be assumed accidental from a recoverability and feedback perspective, and assumed intentional from a security perspective. To achieve this, files that were measured incorrectly may be put back to their original form. Then a reboot may occur so that the files can be re-measured securely. Note that the protected boot process described above relies on self validation of the system by utilizing a TPM. In some embodiments, it is possible for such a system to appear invalid when it is actually still valid. These situations present a clear need for an adequate recovery mechanism.

Such a recovery mechanism can incorporate steps 603 and 604. First, the data identified in the logs that led to the erroneous PCR entry may be returned to a state that can be considered valid. Any number of techniques may be employed to implement such restoration, including the reload of a correct copy of such data from disk. Alternatively, log information may be used to diagnose why the TPM considered the measurement to be invalid. Any data that may have changed can be reverted back to its original state. Second, a reboot may be initiated. Thus, if a software component measurement was invalid, the software component can be reloaded, and re-executed to begin the boot process from the point of error.

FIG. 7 illustrates recovery based in user authentication rather than the return of data to an original state. This may be a desirable alternative to the process of FIG. 6, or may be used upon failure of the process in FIG. 6. The techniques represented by FIG. 7 may be provided as additional features which may be incorporated into products to supplement embodiments that return a system to a valid state in accordance with FIG. 6, or may be provided as a sole means of recovery. The techniques of FIG. 7 are useful, for example, in situations where the hardware on a machine is broken and a disk was migrated to another otherwise identical machine, in which case the otherwise identical machine's sealed TPM secret key may be different. In FIG. 7, a user may authorize that the system should be considered valid, regardless of the entry of invalid PCR entries that resulted in a failed unseal operation.

A number of mechanisms can be used to implement the user authentication techniques of FIG. 7. In general, a first process may be employed to request credentials for user authentication 700. This process may request the credentials from the user directly or may instead trigger some secure software that provides the credentials. A number of variations are available to obtain credentials in step 700. Among the exemplary techniques contemplated are, first, credentials may be provided via removable media. Next, in some embodiments, a pre-boot authentication system may automatically provide credentials in preference to measurement of boot components to validate boot described above. Further, a dual-boot system could store authentication information 700 using DPAPI on a local machine; allowing such a user to boot from an insecure (recovery) partition, authenticate over a domain c/o RAS, and then recover the secure partition. Also, a key-input process similar to the product-ID input could be used. Where recovery is an exception to the normal boot, users are not so much worried about "someone looking over the shoulder" as inputting a very strong random key correctly. In this case, characters might be grouped together with a check character, the user may be alerted when a group of characters are incorrectly entered. Another variation entails putting recovery information on a network share so that retrieval of the information would require network authentication, thereby providing a level of security.

Yet another contemplated process for step 700 could be internet-based. Again, a recovery-partition (or bootable CD) may be used to gain access to a secure server on the internet. There, the user would enter credentials using, for example, MICROSOFT® Passport services; which also provides challenge-response password recovery; and then retrieves a file payload that the recovery process looks for and reads. The service providing the backup & recovery can be detached from the authentication provider.

In short the recovery credentials and secrets may be obtained via any number of different avenues. The credentials need not be easily accessible as with many of the examples above, and could instead require, for example, a phone-call to obtain a secret for entry in response to the request. Upon entry of appropriate credentials, the machine can be configured to boot properly and to reseal new PCR values to a secret in the TPM for subsequent boots.

In exemplary embodiments, a user may be required to obtain authentication credentials by calling their IT department. The IT department can use their system of choice to validate the identity of the caller, and can read the caller a password. When the password is entered, a migration mechanism described below can be used to re-seal the secrets to new PCR values. In addition, such a system could use a password system that results in a password only being usable once, with the secrets resealed to a new password for any subsequent user authentication mechanism, requiring a new phone call (or other user action) should secrets again fail to unseal in the future.

Embodiments of the systems and methods for securely booting a computer may be configured to be upgraded if necessary. An exemplary system and method for performing boot component upgrades is illustrated in FIG. 8. Although the boot components monitored by embodiments of the invention rarely change, it is inevitable that one of these code modules may eventually be changed. Thus, a secure upgrade process is beneficial.

Systems and methods for upgrading one or more boot components may make use of migration of sealed secrets 803 to temporary storage 804. This process may entail placement of appropriate values in PCRs 801 by an upgrade process 800 to unseal the secret(s) 803. The upgrade process 800 may then migrate the secrets 803 to temporary storage 804. The secrets 803 can remain in temporary storage 804 while a boot process is modified, which may result in new sealed PCR values 802a corresponding to measurements of upgraded boot components 805. In many embodiments this need not require a reboot, as the PCR values 802a are known at the current boot and need not change. However, if the code modules are changed, e.g. by replacing them with new component 800, a reboot will ensure that the new code modules are measured and appropriate new values are used in PCRs 802a to reseal secrets 803.

Another method for upgrading one or more boot components may be used in a controlled environment of code modification. In this case, the expected PCR values due to the new code modifications are pre-determined, and the secrets can be sealed to the anticipated PCR values before the system is rebooted. Alternatively, a blanket re-evaluation of the expected PCR values can be made based on code and data that can be measured at boot.

To ensure security of a migration process, a running system may perform the migrations described above according to one or more of following non-limiting list of options:

Prior to a upgrade, a service pack may know it will be changing the OS Loader.

Immediately after a change, for example, after a disk has been formatted.

After change detection on a validated system. For example, at shutdown, the system may notice components have legitimately been modified, and silently perform the migration.

As part of recovery. For example, at system startup, the system may determine a recovery has been performed, and may perform a migration so that the recovery mechanism is not required after the next boot.

Yet another system for maintaining the secure boot process can provide multiple different keys that are created outside the TPM. Each such key can use the same RSA keying material but each key's usage may be bound to different PCR sets and/or passwords. Indeed, such additional keys may be bound to nothing at all. In such embodiments, Then we at least one BLOB may be associated with each disk volume (e.g. partition) that is not bound to anything at all. Each key may be used from a different boot component and ensure the privacy of the BLOB. The password gated key can be used for recovery and the RSA keying material can be escrowed.

While this approach differs only slightly from the secure boot processes described above, significant benefits become clear in maintenance and service: Due to the fact that the RSA keying material was generated outside the TPM and is identical in every key, this RSA material can now be used in a larger scale for multiple users such as employees in a division or of an entire organization. As a result, a master key can be created that allows opening and service for any machine in the organization. The keys are still protected by each TPM's SRK, so the keys can still be considered safe. In this embodiment, however, a central department such as an information technology (IT) department does not have to store one key per machine but rather one key per logical group. It also requires a little less storage space in the boot block to store the multiple keys over multiple BLOBs.

Finally, in the embodiments described above, an administrator can now push down policies and new RSA keys, so the keys are changed frequently on each machine. This will reduce costs in the maintenance of the feature.

Permanent Destruction of Access to Data Using Full Volume Encryption and Protected Boot A byproduct of the secure boot processes described above is that full-volume encryption, i.e. the encryption of almost all the data in a partition, can be efficiently and effectively supported. This can trivialize the effort required to destroy secrets and thereby to destroy the critical information needed to access data on a computer. This effective destruction of data may be valuable in certain settings, in particular, where it is desired to dispose of sensitive data, and more particularly to dispose of such data quickly.

Elimination of the secrets required to operate computers that implement the invention can render such computers unusable without re-installation of software, and can permanently prevent access to data thereon. To accomplish this, the secrets stored inside of the TPM may be reset. This can be done by changing the ownership of the TPM. Any secrets sealed by the TPM are no longer valid. A secondary recovery mechanism must also be destroyed. In the short term however, until this mechanism is destroyed; when the recovery mechanism is kept off-site, it may provide for a way to temporarily disable a machine and then later recover the machine.

When both the secrets stored in the TPM and any recovery mechanism are changed, the content, both code and data, of a machine becomes unobtainable. This very quickly accomplishes a security wipe of a machine. One advantage of such efficient security wiping is that it makes re-sale of a machine to be more practical.

What is claimed is:

1. A computer readable medium, wherein the computer readable medium is not a transitory signal, bearing instructions for a computer, said computer comprising a Hardware Security Module (HSM) that accesses recorded values, compares submitted values indicative of at least one measurement to the recorded values, and releases a sealed secret (a released secret) if the submitted values match the recorded values, said computer readable medium comprising:
  A. instructions for securely booting a computer, comprising:
    i. instructions for measuring data involved in a boot process;
    ii. instructions for submitting a measurement of said data to the HSM;
    iii. instructions for requesting release of the sealed secret from the HSM, wherein said instructions for securely booting a computer cannot successfully complete a normal boot operation without said secret; and
    iv. releasing the sealed secret only if the measurement submitted to the HSM is correct when compared to a recorded value, wherein the released sealed secret is different from the measurement and the recorded value; and
  B. instructions for updating said data involved in a boot process, comprising:
    i. instructions for migrating the released secret to temporary storage where it remains while the data involved in the boot process is updated;
    ii. instructions for measuring updated data involved in the boot process; and
    iii. instructions for restricting access to the migrated released secret by resealing it using the measurement of the updated data involved in the boot process, wherein the secret may be subsequently obtained by submitting at least a measurement of said updated data to the HSM.

2. The computer readable medium of claim 1 wherein the HSM is a Trusted Platform Module (TPM).

3. The computer readable medium of claim 1 wherein the data is at least one of a software and a data component.

4. The computer readable storage medium of claim 1 wherein said instructions for measuring data comprise instructions for computing a hash of the data.

5. The computer readable storage medium of claim 1 wherein said instructions for submitting a measurement comprise instructions for extending a platform configuration register (PCR).

6. The computer readable storage medium of claim 1 wherein the instructions for restricting access to the secret use an anticipated measurement of the updated data.

7. The computer readable storage medium of claim 1, the instructions for updating said data involved in a boot process further comprising instructions for rebooting the computer.

8. A method for recovering a secure computer boot process on a computer comprising a Hardware Security Module (HSM) that accesses recorded values, compares submitted values indicative of at least one measurement to the recorded values, and releases a sealed secret (a released secret) if the submitted values are correct, said method comprising:
  A. securely booting a computer, comprising:
    i. measuring data involved in a boot process;
    ii. submitting a measurement of said data to the HSM;
    iii. requesting release of the sealed secret from the HSM, wherein said instructions for securely booting a computer cannot successfully complete a normal boot operation without said secret;
    iv. releasing the sealed secret only if the measurement submitted to the HSM is correct when compared to a recorded value, wherein the released sealed secret is different from the measurement and the recorded value;
  B. updating said data involved in a boot process, comprising:
    i. migrating the released secret to temporary storage where it remains while the data involved in the boot process is updated;
    ii. measuring updated data involved in the boot process;
    iii. restricting access to the migrated released secret by resealing it using the measurement of the updated data involved in the boot process, wherein the secret may be subsequently obtained by submitting at least a measurement of said updated data to the HSM.

9. The method of claim 8 wherein the HSM is a Trusted Platform Module (TPM).

10. The method of claim 8 wherein the data is a software component.

11. The method of claim 8 wherein said measuring data comprises computing a hash of the data.

12. The method of claim 8 wherein said submitting a measurement comprises extending a platform configuration register (PCR).

13. The method of claim 8 wherein an anticipated measurement of the updated data involved in the boot process is used when resealing the migrated released secret.

14. The method of claim 8, the step of updating said data involved in a boot process further comprising rebooting the computer.

15. A computer comprising a Hardware Security Module (HSM) that accesses recorded values, compares submitted values indicative of at least one measurement to the recorded values, and releases a sealed secret (a released secret) if the submitted values are correct, said computer comprising:
   A. means for securely booting a computer, comprising:
      i. means for measuring data involved in a boot process;
      ii. means for submitting a measurement of said data to the HSM;
      iii. means for requesting release of the sealed secret from the HSM, wherein said means for securely booting a computer cannot successfully complete a normal boot operation without said secret;
      iv. means for releasing the sealed secret only if the measurement submitted to the HSM is correct when compared to a recorded value, wherein the released sealed secret is different from the measurement and the recorded value;
   B. means for updating said data involved in a boot process, comprising:
      i. means for migrating the released secret to temporary storage where it remains while the data involved in the boot process is updated;
      ii. means for measuring updated data involved in the boot process;
      iii. means for restricting access to the migrated released secret by resealing it using the measurement of the updated data involved in the boot process, wherein the secret may be subsequently obtained by submitting at least a measurement of said updated data to the HSM.

16. The computer of claim 15 wherein the HSM is a Trusted Platform Module (TPM).

17. The computer of claim 15 wherein the data is a software component.

18. The computer of claim 15 wherein said means for measuring data comprise means for computing a hash of the data.

19. The computer of claim 15 wherein said means for submitting a measurement comprise means for extending a platform configuration register (PCR).

20. The computer of claim 15, the means for updating said data involved in a boot process further comprising means for rebooting the computer.

* * * * *

UNITED STATES PATENT AND TRADEMARK OFFICE
CERTIFICATE OF CORRECTION

PATENT NO.        : 8,028,172 B2                                         Page 1 of 1
APPLICATION NO.   : 11/036018
DATED             : September 27, 2011
INVENTOR(S)       : Jamie Hunter et al.

It is certified that error appears in the above-identified patent and that said Letters Patent is hereby corrected as shown below:

In column 16, line 22, in Claim 4, after "readable" delete "storage".

In column 16, line 25, in Claim 5, after "readable" delete "storage".

In column 16, line 29, in Claim 6, after "readable" delete "storage".

In column 16, line 32, in Claim 7, after "readable" delete "storage".

Signed and Sealed this
Twenty-ninth Day of November, 2011

David J. Kappos
*Director of the United States Patent and Trademark Office*